(12) United States Patent
Wooden

(10) Patent No.: US 12,356,119 B2
(45) Date of Patent: Jul. 8, 2025

(54) RULE CONSTRAINING STREAM ASSEMBLY AT CLIENT-SIDE MEDIA PLAYER

(71) Applicant: iHeartMedia Management Services, Inc., San Antonio, TX (US)

(72) Inventor: Richard D. Wooden, Ogallala, NE (US)

(73) Assignee: iHeart Media Management Services, Inc., San Antonio, TX (US)

( * ) Notice: Subject to any disclaimer, the term of this patent is extended or adjusted under 35 U.S.C. 154(b) by 253 days.

(21) Appl. No.: 17/388,251

(22) Filed: Jul. 29, 2021

(65) Prior Publication Data

US 2021/0360200 A1   Nov. 18, 2021

Related U.S. Application Data

(63) Continuation of application No. 15/943,018, filed on Apr. 2, 2018, now Pat. No. 11,089,267, which is a
(Continued)

(51) Int. Cl.
| | |
|---|---|
| *H04N 7/16* | (2011.01) |
| *H04L 65/613* | (2022.01) |
| *H04L 65/75* | (2022.01) |
| *H04L 67/306* | (2022.01) |
| *H04L 67/62* | (2022.01) |

(Continued)

(52) U.S. Cl.
CPC ........... *H04N 7/163* (2013.01); *H04L 65/613* (2022.05); *H04L 65/762* (2022.05); *H04L 67/306* (2013.01); *H04L 67/62* (2022.05); *H04N 21/458* (2013.01); *H04N 21/4622* (2013.01); *H04N 21/4755* (2013.01); *H04N 21/6125* (2013.01); *H04N 21/8106* (2013.01)

(58) Field of Classification Search
CPC ........... H04N 21/4325; H04N 21/4622; H04N 21/4826; H04N 21/6125; H04N 7/163; H04N 21/458; H04N 21/4755; H04N 21/48106; H04N 21/4825; H04N 21/25891; H04L 65/613; H04L 65/762; H04L 67/306; H04L 67/62; H04L 61/2525

See application file for complete search history.

(56) References Cited

U.S. PATENT DOCUMENTS

| | | |
|---|---|---|
| 5,590,282 A | 12/1996 | Clynes |
| 5,726,909 A | 3/1998 | Krikorian |

(Continued)

FOREIGN PATENT DOCUMENTS

| | | |
|---|---|---|
| WO | 9939466 | 8/1999 |
| WO | 0128260 | 4/2001 |

*Primary Examiner* — Tonia L Dollinger
*Assistant Examiner* — Linh T. Nguyen
(74) *Attorney, Agent, or Firm* — Harness, Dickey & Piercce, P.L.C

(57) ABSTRACT

A streaming server receives a request to provide a requested media stream to a client-side media player. The client-side media player is capable of assembling portions of different media streams into a single playout stream and outputting the single playout stream to a user interface. In response to receiving the request, the streaming server transmits the requested media stream to the client-side media player. The streaming server also transmits a stream provider rule, which constrains assembly of the single playout stream by the client-side media player.

17 Claims, 4 Drawing Sheets

Related U.S. Application Data continuation of application No. 12/568,670, filed on Sep. 29, 2009, now abandoned.

(51) Int. Cl.
*H04N 21/458* (2011.01)
*H04N 21/462* (2011.01)
*H04N 21/475* (2011.01)
*H04N 21/61* (2011.01)
*H04N 21/81* (2011.01)

(56) References Cited

U.S. PATENT DOCUMENTS

| | | | |
|---|---|---|---|
| 6,192,340 B1 | 2/2001 | Abecassis | |
| 6,314,094 B1 | 11/2001 | Boys | |
| 6,546,421 B1 | 4/2003 | Wynblatt et al. | |
| 6,933,433 B1 | 8/2005 | Porteus et al. | |
| 7,075,994 B2 * | 7/2006 | Ihara | H04N 21/236 |
| | | | 375/E7.023 |
| 7,320,025 B1 * | 1/2008 | Steinberg | H04N 21/233 |
| | | | 725/87 |
| 7,668,936 B1 | 2/2010 | Krikorian et al. | |
| 7,711,838 B1 | 5/2010 | Boulter et al. | |
| 8,060,635 B2 | 11/2011 | Rosenberg et al. | |
| 8,150,918 B1 * | 4/2012 | Edelman | H04L 65/613 |
| | | | 715/753 |
| 8,332,528 B2 | 12/2012 | Mobin et al. | |
| 8,463,780 B1 | 6/2013 | Rosenberg et al. | |
| 8,527,877 B2 | 9/2013 | Wohlert | |
| 8,621,508 B2 | 12/2013 | Rowe et al. | |
| 8,671,021 B2 * | 3/2014 | Maharajh | G06F 16/487 |
| | | | 705/14.51 |
| 9,183,887 B2 | 11/2015 | Barry | |
| 9,443,266 B2 * | 9/2016 | Boulter | H04N 21/443 |
| 2002/0032019 A1 | 3/2002 | Marks et al. | |
| 2002/0049974 A1 | 4/2002 | Shnier | |
| 2002/0112237 A1 | 8/2002 | Kelts | |
| 2002/0138630 A1 | 9/2002 | Solomon et al. | |
| 2002/0188949 A1 | 12/2002 | Wang et al. | |
| 2003/0112258 A1 | 6/2003 | Dietz et al. | |
| 2004/0039796 A1 | 2/2004 | Watkins | |
| 2006/0037047 A1 | 2/2006 | DeYonker et al. | |
| 2006/0067296 A1 | 3/2006 | Bershad et al. | |
| 2006/0173916 A1 * | 8/2006 | Verbeck Sibley | G06F 16/437 |
| 2006/0265421 A1 * | 11/2006 | Ranasinghe | G06F 16/68 |
| 2007/0094082 A1 * | 4/2007 | Yruski | G06Q 30/0277 |
| | | | 705/14.56 |
| 2007/0162571 A1 * | 7/2007 | Gupta | H04N 21/2343 |
| | | | 348/E5.002 |
| 2007/0174866 A1 * | 7/2007 | Brown | H04N 21/6581 |
| | | | 348/E7.071 |
| 2007/0186006 A1 | 8/2007 | Murray | |
| 2007/0243509 A1 * | 10/2007 | Stiebel | G06Q 30/02 |
| | | | 434/236 |
| 2007/0277203 A1 * | 11/2007 | Jung | H04H 60/65 |
| | | | 725/62 |
| 2007/0297755 A1 | 12/2007 | Holt et al. | |
| 2008/0098027 A1 | 4/2008 | Aarts | |
| 2008/0127286 A1 * | 5/2008 | Kim | H04N 21/41407 |
| | | | 725/105 |
| 2008/0242280 A1 | 10/2008 | Shapiro et al. | |
| 2009/0044216 A1 | 2/2009 | McNicoll | |
| 2009/0061764 A1 | 3/2009 | Lockhart et al. | |
| 2009/0084249 A1 | 4/2009 | Kemp et al. | |
| 2009/0106442 A1 * | 4/2009 | Liu | H04N 21/4722 |
| | | | 709/231 |
| 2009/0148124 A1 * | 6/2009 | Athsani | H04N 21/6582 |
| | | | 386/241 |
| 2009/0204906 A1 * | 8/2009 | Irving | H04N 7/15 |
| | | | 715/753 |
| 2009/0319574 A1 | 12/2009 | Burgard et al. | |
| 2010/0131844 A1 | 5/2010 | Wohlert | |
| 2010/0146135 A1 | 6/2010 | Evans et al. | |
| 2010/0268360 A1 | 10/2010 | Ingrassia et al. | |
| 2010/0287580 A1 * | 11/2010 | Harding | H04L 67/53 |
| | | | 705/14.46 |
| 2011/0119127 A1 | 5/2011 | Hangartner | |
| 2013/0007223 A1 * | 1/2013 | Luby | H04L 65/70 |
| | | | 709/219 |
| 2013/0138779 A1 * | 5/2013 | Krikorian | H04N 21/4622 |
| | | | 709/219 |
| 2015/0128039 A1 * | 5/2015 | Wieder | G06F 21/10 |
| | | | 715/716 |
| 2017/0262888 A1 * | 9/2017 | Jhoney | H04H 20/106 |

* cited by examiner

RULE CONSTRAINING STREAM ASSEMBLY AT CLIENT-SIDE MEDIA PLAYER

CROSS REFERENCE TO RELATED PATENTS

The present U.S. Utility Patent application claims priority pursuant to 35 U.S.C. § 120 as a continuation of U.S. Utility application Ser. No. 15/943,018 entitled "RULES-BASED USER PREFERENCES FOR STREAM SWITCHING IN AN INTERNET RADIO PLAYER," filed Apr. 2, 2018, which is a continuation of U.S. Utility application Ser. No. 12/568,670 entitled "RULES-BASED USER PREFERENCES FOR STREAM SWITCHING IN AN INTERNET RADIO PLAYER," filed Sep. 29, 2009, which are hereby incorporated herein by reference in their entirety and made part of the present U.S. Utility Patent Application for all purposes.

BACKGROUND OF THE INVENTION

1. Technical Field of the Invention

The present invention generally relates to client-side assembly of playout stream, and more particularly to placing constraints on the client-side assembly of a playout stream.

2. Description of Related Art

Contemporary methods of listening to music often involve use of the Internet to obtain access to digital audio media. One way of listening to music which involves use of the Internet is downloading an audio file to a computer, phone, portable media player, etc., using a standard communications protocol such as file transfer protocol (FTP). When the audio file is downloaded, the file is essentially copied from its source (a remote server) to a local device which can then store the audio file. This means that a device such as a personal computer would have a digital copy of the audio file. With this audio file, a listener can do many things, such as listen to the audio file when desired, copy the file to another device or location, or mix the audio file with another sound track. Once a listener has obtained a copy of an audio file, they do not require a connection to the Internet in order to listen to the audio file since it can be accessed directly from the local device onto which it was initially downloaded.

An alternative to downloading audio (or video) content from the Internet is to stream the content from the Internet. When audio content is streamed over the Internet, a listener has real-time access to the audio reproduction, but access is much more limited when compared to downloading audio files. Streamed audio data is transferred using a different protocol than those used for regular file downloads like FTP, so that listeners are not able to obtain an actual copy of the audio file. For example, the real time streaming protocol (RTSP) is commonly used to establish and control media sessions between client-server end points. Clients can issue simple commands such as play and pause to facilitate real-time control of the playback of media files from the server. This listening alternative has several significant differences from downloading audio files. The most notable difference is that, since a listener does not have an actual copy of the audio file, the listener cannot transfer the file to other devices (e.g., portable or hand-held devices). This limitation is specifically designed to reduce the pirating of music. Also, if a listener does not have access to the Internet, then he or she has no way of streaming a given audio file, and a low-speed or unreliable connection will result in poor reproduction quality.

Internet media sources which provide streaming of audio data over the Internet include internet radio stations. An internet radio station can for example stream the same content as a traditional (terrestrial) radio station, or can stream setlists pre-programmed by human programmers with or without a disc jockey. Internet radio stations are similar to terrestrial radio stations in that they broadcast songs over a communications medium. However, internet radio stations are often more personalized than terrestrial radio stations. For example, some internet radio stations allow listeners to provide input or feedback such as selecting a particular genre, artist or format. These stations then apply a simple matching algorithm to the listener feedback to create a sequence for their streaming media. The internet music service Pandora provides more advanced streaming internet radio stations that are generally enabled by the user based on a seed artist or song. A recommendation engine then uses rules to match other content that the user may like to the seed selection based on characteristics assigned to each song by a Pandora professional. Another variant of this service includes Last.fm, where the internet radio station's program is based on aggregations of its users' listening habits. These preferences result in streams that the user can select from after assigning seeds for each stream and then refining the selections by use of a "more of this" feature or "less of this" feature for each song played.

The foregoing internet radio stations may be considered non-interactive forms of personalized internet streaming. An interactive service is one which allows a listener to receive a stream where the listener has the power to dictate the songs being played, such as typical listener-supported internet radio stations which allow the audience to select specific songs to be included in a station's playlist. Conversely, a broadcast-type transmission in which only the station makes the musical selections is non-interactive. Thus, Pandora and Last.fm are non-interactive because the broadcaster is making the music selections, although the listener is indirectly influencing the songs being played. The interactive or non-interactive nature of a stream can affect royalties or other fees that are required for transmission and performance of the streamed content.

Several of these avenues for various listening experiences are illustrated in the generalized process of FIG. 1 for an internet radio end user listening to streaming internet radio content. The listener can provide basic feedback to one or more internet radio stations which create a first media sequence (10). The listener can also select a seed song or artist to allow one or more additional internet radio stations to program a second media sequence using a recommendation engine (12). One or more other radio stations provide a third media sequence produced by human programmers without input or feedback from the listeners (14). These media sequences are available to the listener over the Internet as a plurality of internet radio streaming media content (16). An internet radio player software application running on a computer or hand-held device presents the various internet radio station choices for selection by the listener (18). The listener then selects a single station based on personal preference, such as music genre, artist, station call sign, etc. (20). The player application accordingly sets up a streaming connection with the chosen "Content A" internet radio streaming media (22), and outputs the selected stream to the audio system for the listening enjoyment of the user (24).

There are several disadvantages to the internet radio station platforms mentioned above. Those internet radio stations which have only pre-programmed playlists lack the ability for any personalization or customizing. If a listener is listening to a song on a pre-programmed playlist, there is no way for the listener to indicate their like or dislike for that song, so the playlist is unable to adapt to a user preference. Preprogrammed playlists may also consistently play certain songs from a genre or subgenre which the listener actively dislikes. Those internet radio stations with playlists that are personalized based on a specific genre, artist, format, etc., are still somewhat restricting to listeners because oftentimes, although a listener might greatly like one specific song by a specific artist, they might not like other songs by that same artist or other versions (covers) of the song. Similarly, if a listener likes a specific artist from a specific genre, they might not like all artists of that same genre. Those internet radio stations with personalized playlists based on a recommendation engine (similar to Pandora) offer more adaptability and personalization than the previously mentioned internet radio stations. However, recommendation engines have limitations too. Oftentimes the algorithms which govern recommendation engines do not agree with user preferences. For example, the recommendation engine must determine exactly what aspect of a song is being referred to whenever the user indicates the "more of this" preference for the song. The recommendation engine's interpretation of what "more of this" means could be very far off from what a given user actually intends. The various characteristics associated with the songs that are used by the recommendation engine also depend on subjective judgments by the station professionals.

In light of the foregoing, it would be desirable to devise an improved method of presenting streaming content from the Internet, particularly music, which enables a user to craft an even more customized listening experience. It would be further advantageous if the method could afford listeners more variety and options when it comes to choosing which internet radio stations to listen to.

BRIEF SUMMARY OF THE INVENTION

The foregoing objects are achieved in a method of personalizing streaming media content, by assigning respective play amounts to a plurality of different stream sources connected to a network, and successively playing a plurality of streams from the different stream sources at a playback device in communication with the network, wherein the plurality of streams are played for play times which generally correspond to the respective play amounts. The streaming media content can be audio content, in which case the playback device includes an audio output device, e.g., speakers. In the illustrative implementation, the play time for a given stream is calculated as a user-defined percentage for the stream source associated with the given steam multiplied by an expected listening period. The different stream sources can include different musical genres, as well as news, sports, weather, or traffic.

The play amounts can be automatically adjusted based on a user selection of one of the stream sources for increased or decreased play. A particular stream can also be played at a predetermined clock time, and the streams can further be ordered for play according to a user preference.

The above as well as additional objectives, features, and advantages of the present invention will become apparent in the following detailed written description.

BRIEF DESCRIPTION OF THE SEVERAL VIEWS OF THE DRAWING(S)

The present invention may be better understood, and its numerous objects, features, and advantages made apparent to those skilled in the art by referencing the accompanying drawings.

Figure 3:
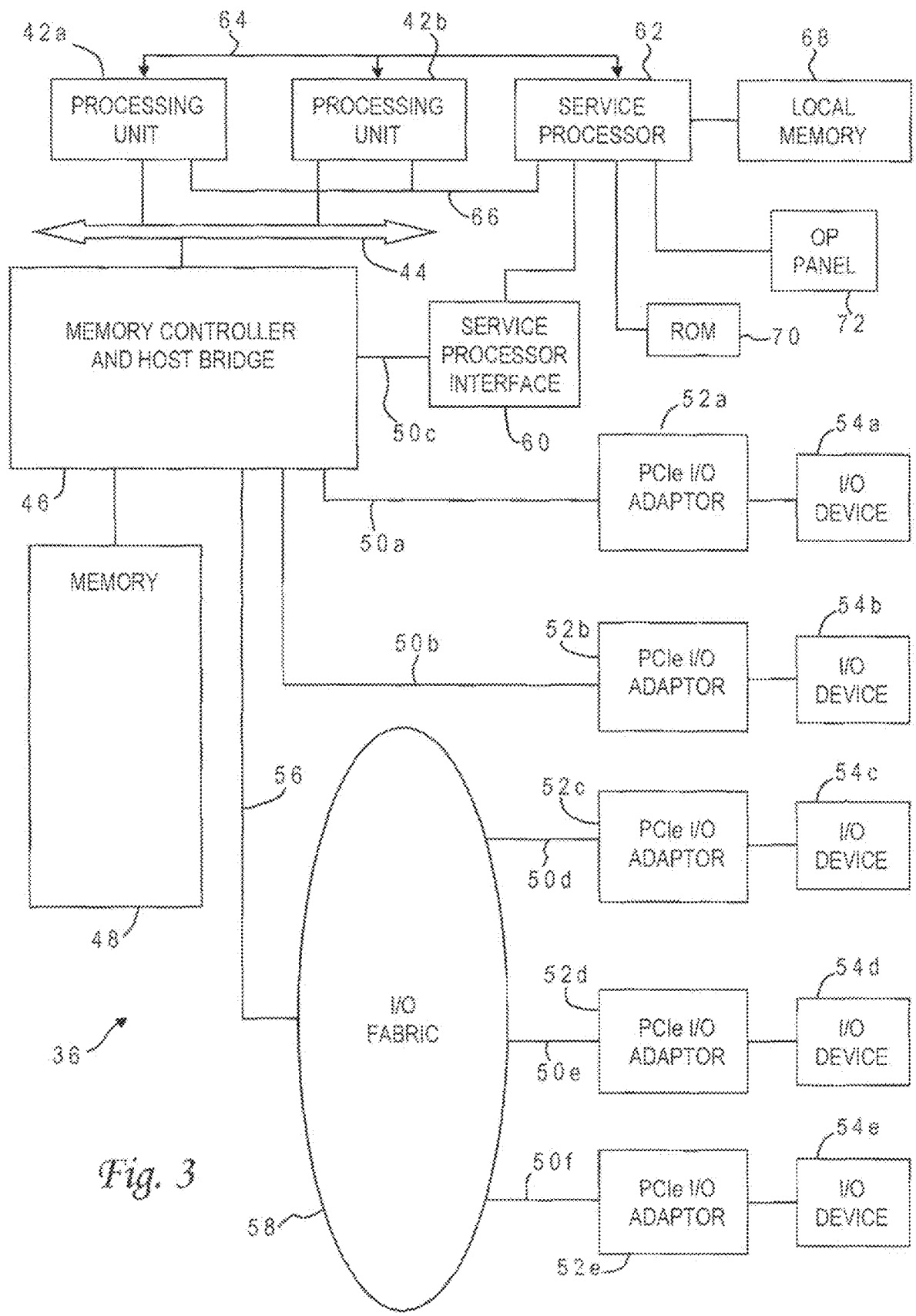
Figure 4:
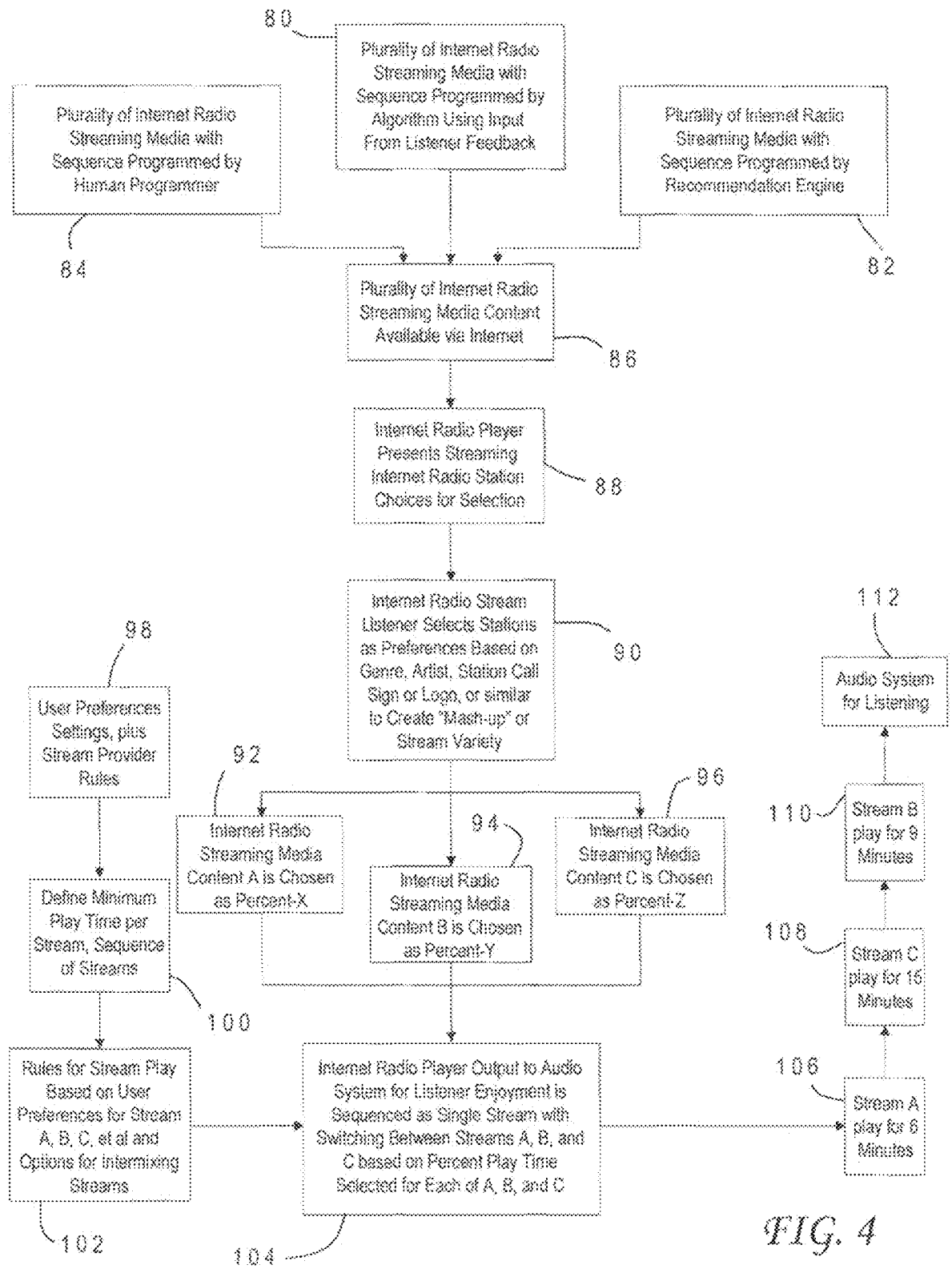

FIG. 3 is a block diagram of a computer system programmed to present streaming internet radio station media in accordance with one embodiment of the present invention; and FIG. 4 is a chart illustrating the logical flow for an internet radio station presentation process in which a user assigns preferences to access a variety of different internet radio streams in accordance with one implementation of the present invention.

The use of the same reference symbols in different drawings indicates similar or identical items.

DETAILED DESCRIPTION OF THE INVENTION

Figure 1:
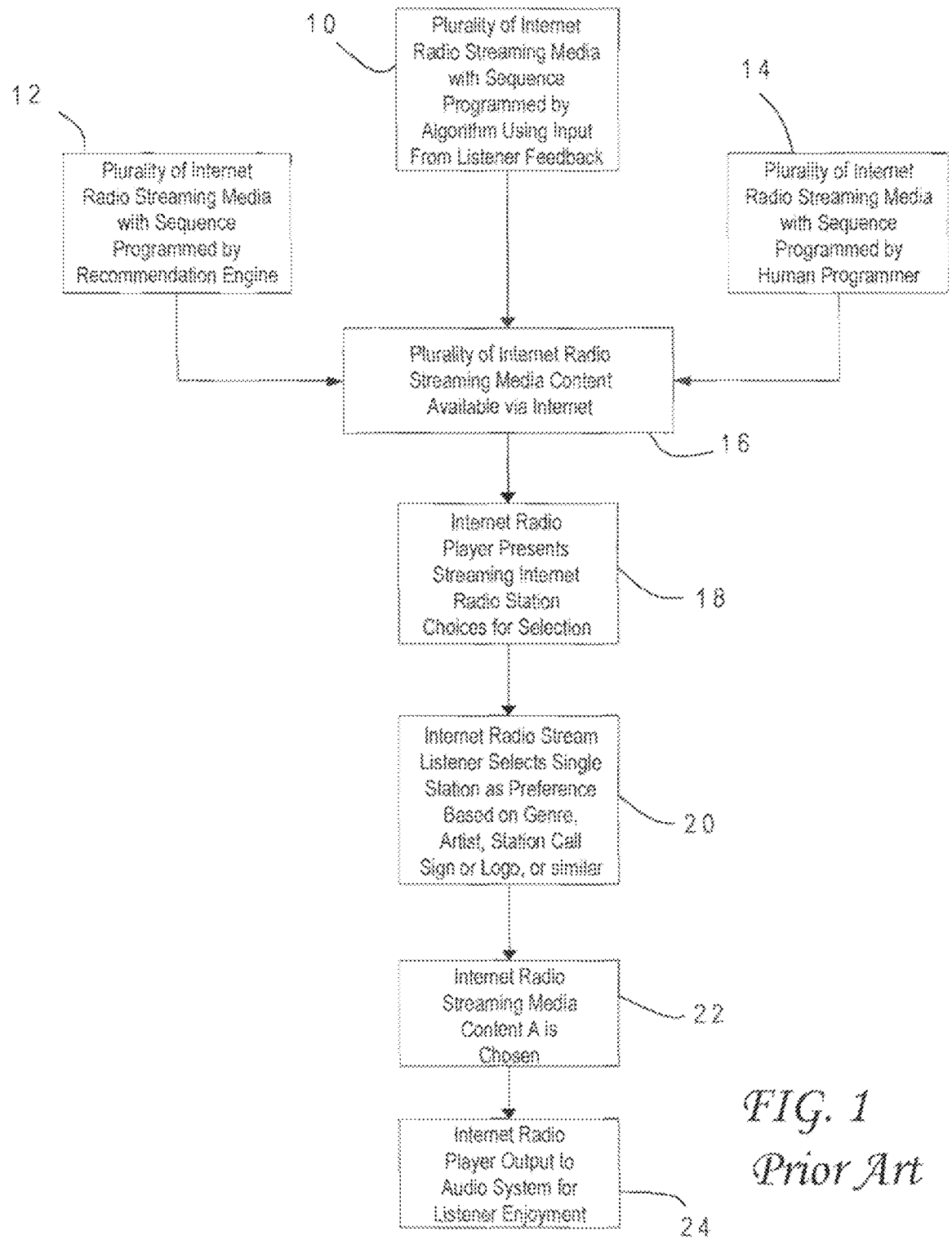
FIG. 1 is a chart illustrating the logical flow for a conventional process in which a user selects an internet radio station for listening.
Figure 2:
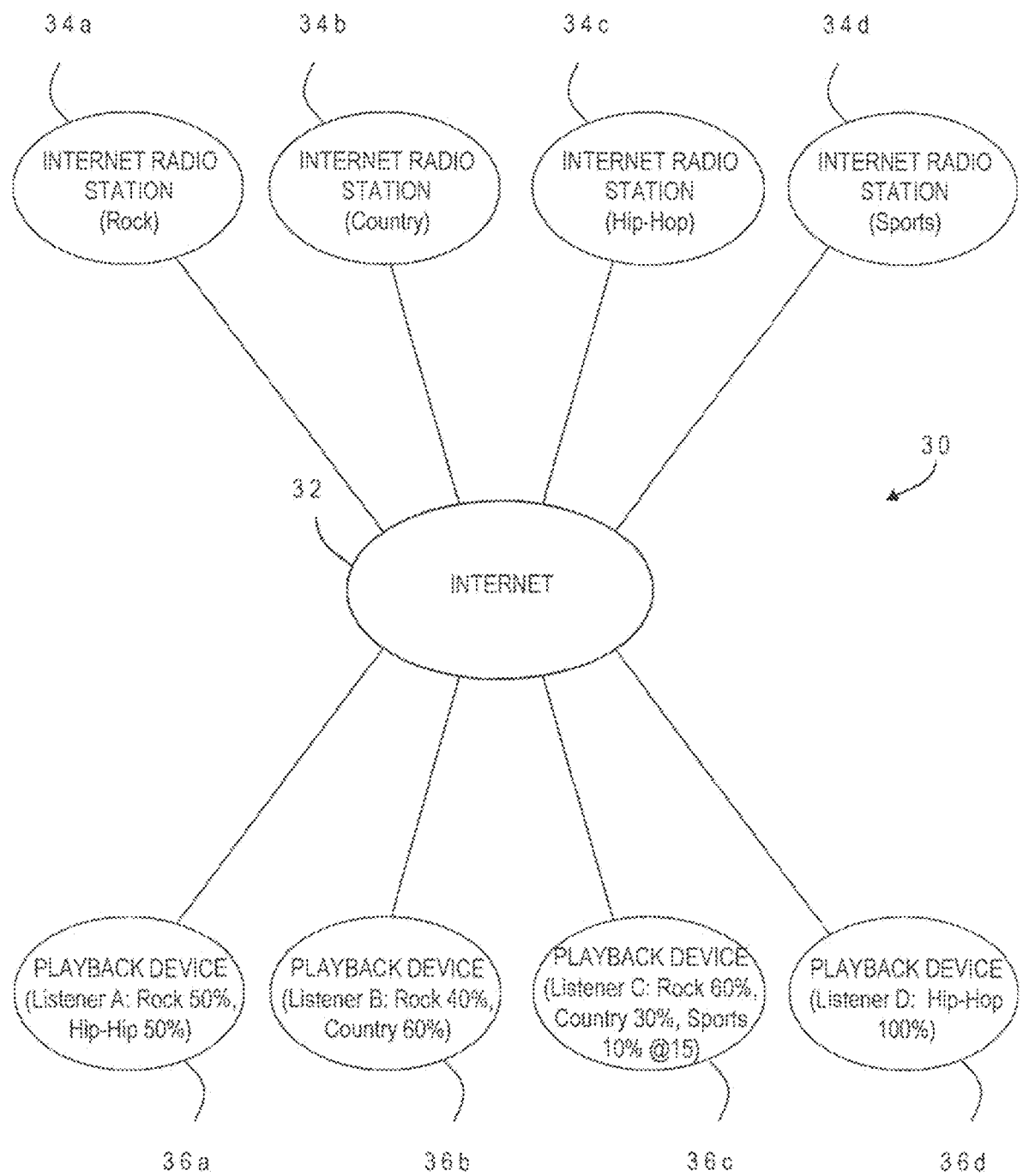
FIG. 2 is a hub-and-spoke diagram of a streaming media system with the Internet at the center acting as a communications medium through which multiple users can access streaming internet radio stations having different content (music genres, sports, etc.) based on their preferences in accordance with one implementation of the present invention.

With reference now to the figures, and in particular with reference to FIG. 2, there is depicted one embodiment 30 of a streaming media system contemplated by the present invention. Streaming media system 30 is generally comprised of the Internet 32, streaming internet radio stations 34a, 34b, 34c, 34d which provide a plurality of audio selections, and playback devices 36a, 36b, 36c, 36d which include audio receivers for different listeners A-D. While the present invention is particularly suited for internet radio transmissions, it can alternatively be used with any other communications medium besides the Internet, including private networks such as cellular networks, local area networks (LANs), wide area networks (WANs), or wireless local area networks (WLANs) which provide different streaming stations or channels to multiple listeners. The illustration of only four streaming internet radio stations 34a, 34b, 34c, 34d is exemplary as there could be any number of streaming internet stations. Similarly, the illustration of only four playback devices 36a, 36b, 36c, 36d should not be construed in a limiting sense.

Internet radio stations 34a, 34b, 34c, 34d can provide individually-selectable streaming audio content. In this embodiment, internet radio station 34a plays rock music, internet radio station 34b plays country music, internet radio station 34c plays hip-hop music, and internet radio station 34d provides sports information in an audio form. These stations can employ any of the personalization techniques described above in the Background section. For example, rock station 34a may stream a playlist programmed by a basic matching algorithm using an artist selection by the listener, country station 34b may stream a playlist selected according to a recommendation engine responsive to a seed song chosen by the listener, and hip-hop station 34c may stream a pre-programmed playlist that is independent of any listener feedback or input. Internet radio stations 34a, 34b, 34c, 34d can transmit their streams using any convenient protocols, such as the real time streaming protocol (RTSP).

Playback devices 36a, 36b, 36c, 36d can include hardware and software for connecting to network 32 or an intermediary agent, software and an audio system (one or more speakers) for receiving the streams from the network-based audio sources according to their protocols and reproducing audible output from the radio station streams, and a user interface which allows the listener to assign preference settings for streaming content as described further below. The playback devices may be personal computer systems such as that described in conjunction with FIG. 3, or may alternatively be special-purpose digital electronic devices such as "smart" phones or other wireless handheld devices (e.g., an iPhone® or Blackberry®). The playback devices are assigned some type of network identifiers such as media access control (MAC) addresses to facilitate direct communication with the streaming audio sources.

In the illustrative embodiment each playback device 36a, 36b, 36c, 36d can execute a streaming internet radio station playback application which includes the aforementioned user interface and audio reproduction software. A given listener manually enters an internet address or uniform resource locator (URL) for any desired internet radio station, or imports network addresses from an external file. The listener can customize the listening experience by defining preference settings for each selected internet radio station. In the preferred implementation the preference settings are numbers representing a percentage of total play time. Respective play amounts are then assigned to the different listener selections based on these percentages, and the different streams are successively played for play times which generally correspond to the respective play amounts.

For example, Listener A can control playback device 36a to define a 50% play time for rock station 34a and a 50% play time for hip-hop station 34c to create the total listening experience. Using an expected listening period of one hour, the playback application can enable the stream from rock station 34a for thirty minutes and then enable the stream from hip-hop station 34c for another thirty minutes, continuing to switch between these two streams every thirty minutes for as long as the internet radio player application is running to meet the expected percent play time for each internet radio stream. Listener B can control playback device 36b to define a 40% play time for rock station 34a and a 60% play time for country station 34b. Listener C can control playback device 36c to define a 60% play time for rock station 34a, a 30% play time for country station 34b, and a 10% play time for sports station 34d. Listener D only likes hip-hop music and so can control playback device 36c to define a 100% play time for hip-hop station 34c.

The number of internet radio stations and their play percentages are merely representative, and the user can select any number of internet radio streams and any percent of time for playback of a given stream, limited only by the number of stations available and the granularity allowed by the preferences in the specific internet radio player. The play times can alternatively be entered by the user as absolute values (e.g., minutes), rather than percentages. The invention is also not limited to musical streams, and could by way of example and without limitation also encompass news, weather, and traffic stations or focused advertising streams. Alternatively, selected streams could all be the same musical genre but include different radio station formats. The streams could additionally be video rather than audio, or multimedia, as well as text-only streams for the hearing-impaired. If a playback device is able to store the streaming data for later playback, e.g., in a local cache, these stored streams can be reproduced in accordance with the player-defined schedule.

Any of the listeners can refine the percent play for each stream by activating features of the user interface in real-time to invoke the rule-based exposure parameter selected by the listener, for example, duration. Buttons labeled "more of this stream" or "less of this stream" can be activated while a song is playing. If the "more of this stream" button is selected then the internet radio player automatically adjusts the play time for the currently-playing stream, for example incrementing the percentage by a preset value (e.g., 5%), and the percentages for other selected radio stations are appropriately adjusted (e.g., by reducing the percentages pro-rata with rounding of percentages to whole numbers). If the "less of this stream" button is selected, then the internet radio player similarly adjusts the play time for that stream downward while increasing the other selected streams' play times.

A player constructed in accordance with the present invention may advantageously allow the user to adjust the expected listening period and thereby more accurately accommodate the intended proportions of streaming content. The player may have an added feature allowing the user to set a preferred order of the streams. The player may also assign different output volumes for the different selected streams.

Actual play times of musical content from each stream might be less than desired due to the insertion of commercials, disc jockey banter, etc., so the play times might only generally correspond to the respective play amounts. More intelligent players could further attempt to switch between streams at a break point in the current stream, e.g., waiting until after the end of a song, which can be determined by white space (no audio transmission for a short, predefined period) or from signals encoded in the streaming transmission. A player can also be programmed to enable a stream to be scheduled, within its percentage constraint, at a specific time or times during the day such as the top-of-hour, every 15 or 30 minutes, etc. For example, Listener C has programmed playback device 36c to play sports station 34d beginning at 15 minutes after the hour.

The present invention accordingly provides a richer listening experience than that attained by just listening to any single internet radio stream, even if the single stream already reflects a user's preferences. However, the degree of personalization should not be considered interactive since the stream switching within the percent constraints, without listener intervention. Nevertheless, other implementations could allow for varying levels of interactivity, such as allowing the user to enable a "more of this" or "less of this" feature or similar listener exposure metrics for specific content within a stream; for example a user may choose to have "more of this" type of commercial (for cars, restaurants, travel etc.) or "less of this" type of commercial.

With further reference to FIG. 3, there is depicted one embodiment 36 of a computer system in which the present invention may be implemented to provide preferential stream switching. Computer system 36 is a symmetric multiprocessor (SMP) system having a plurality of processors 42a, 42b connected to a system bus 44. System bus 44 is further connected to a combined memory controller/host bridge (MC/HB) 46 which provides an interface to system memory 48. System memory 48 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 46 also has an interface to peripheral component interconnect (PCI) Express links 50*a*, 50*b*, 50*c*. Each PCI Express (PCIe) link 50*a*, 50*b* is connected to a respective PCIe adaptor 52*a*, 52*b*, and each PCIe adaptor 52*a*, 52*b* is connected to a respective input/output (I/O) device 54*a*, 54*b*. MC/HB 46 may additionally have an interface to an I/O bus 56 which is connected to a switch (I/O fabric) 58. Switch 58 provides a fan-out for the I/O bus to a plurality of PCI links 50*d*, 50*e*, 50*f*. These PCI links are connected to more PCIe adaptors 52*c*, 52*d*, 52*e* which in turn support more I/O devices 54*c*, 54*d*, 54*e*. The I/O devices may include, without limitation, a keyboard, a graphical pointing device (mouse), a microphone, a display device, speakers, a permanent storage device (hard disk drive) or an array of such storage devices, an optical disk drive, and a network card for connection to the Internet. Each PCIe adaptor provides an interface between the PCI link and the respective I/O device. MC/HB 46 provides a low latency path through which processors 42*a*, 42*b* may access PCI devices mapped anywhere within bus memory or I/O address spaces. MC/HB 46 further provides a high bandwidth path to allow the PCI devices to access memory 48. Switch 58 may provide peer-to-peer communications between different endpoints and this data traffic does not need to be forwarded to MC/HB 46 if it does not involve cache-coherent memory transfers. Switch 58 is shown as a separate logical component, but it could be integrated into MC/HB 46.

In this embodiment, PCI link 50*c* connects MC/HB 46 to a service processor interface 60 to allow communications between I/O device 54*a* and a service processor 62. Service processor 62 is connected to processors 42*a*, 42*b* via a JTAG interface 64, and uses an attention line 66 which interrupts the operation of processors 42*a*, 42*b*. Service processor 62 may have its own local memory 68, and is connected to read-only memory (ROM) 70 which stores various program instructions for system startup. Service processor 62 may also have access to a hardware operator panel 72 to provide system status and diagnostic information.

In alternative embodiments computer system 36 may include modifications of these hardware components or their interconnections, or additional components, so the depicted example should not be construed as implying any architectural limitations with respect to the present invention.

When computer system 36 is initially powered up, service processor 62 uses JTAG interface 64 to interrogate the system (host) processors 42*a*, 42*b* and MC/HB 46. After completing the interrogation, service processor 62 acquires an inventory and topology for computer system 36. Service processor 62 then executes various tests such as built-in-self-tests (BISTs), basic assurance tests (BATs), and memory tests on the components of computer system 36. Any error information for failures detected during the testing is reported by service processor 62 to operator panel 72. If a valid configuration of system resources is still possible after taking out any components found to be faulty during the testing, then computer system 36 is allowed to proceed. Executable code is loaded into memory 48 and service processor 62 releases host processors 42*a*, 42*b* for execution of the program code, e.g., an operating system (OS) which is used to launch applications and in particular the internet radio player application of the present invention, the output of which may be sent to an audio device of the system (an I/O device 54). While host processors 42*a*, 42*b* are executing program code, service processor 62 may enter a mode of monitoring and reporting any operating parameters or errors, such as the cooling fan speed and operation, thermal sensors, power supply regulators, and recoverable and non-recoverable errors reported by any of processors 42*a*, 42*b*, memory 48, and MC/HB 46. Service processor 62 may take further action based on the type of errors or defined thresholds.

While the illustrative implementation provides program instructions embodying the present invention on a disk drive of computer system 36, those skilled in the art will appreciate that the invention can be embodied in a digital program product utilizing other machine-readable or storage media. The program instructions may be written in the C++ programming language for an AIX environment or in other programming languages suitable for other operating system platforms. Computer system 36 carries out program instructions for an internet radio player that uses novel preference techniques to switch between multiple media streams. Accordingly, a program embodying the invention may include conventional aspects of various internet radio players, and these details will become apparent to those skilled in the art upon reference to this disclosure.

The present invention may be further understood with reference to the chart of FIG. 4 illustrating the logical flow for one implementation of a user-customized streaming experience. The listener can provide basic feedback to one or more internet radio stations which create a first media sequence (80). The listener can also select a seed song or artist to allow one or more additional internet radio stations to program a second media sequence using a recommendation engine (82). One or more other radio stations provide a third media sequence produced by human programmers without input or feedback from the listeners (84). These media sequences are available to the listener over the Internet as a plurality of internet radio streaming media content (86). The internet radio player software application running on computer system 36 can present the various internet radio station choices for selection by the listener (88). The listener then selects a plurality of stations based on personal preference, such as music genre, artist, station call sign, etc., to create a desired variety of media streams (90). For each selected station a play time percentage is assigned. In this example internet radio streaming media content A is chosen for X-percent of the time (92), internet radio streaming media content B is chosen for Y-percent of the time (94), and internet radio streaming media content C is chosen for Z-percent of the time (96). The number of streams the listener chooses is arbitrary, as well as the percentage listening times for each stream. If the sum of the percentages does not add to 100%, the player can either query the user for corrected percentages or automatically adjust the percentages using the appropriate multiplicative factor.

Separately from the user preferences defined in boxes 92, 94 and 96, there are additional user settings and stream provider rules which govern the internet radio player output (98). These settings and rules can for example define the minimum play time per stream or order of streams (100). The settings and rules can also be used to establish rules for stream play and options for intermixing streams (102). Using these settings and rules, the internet radio player output to the audio system can be sequenced as a single stream with switching between the internet radio streaming media content A, B, and C based on the percent play time for each respective stream (104). One realization of this process for an expected listening period of 30 minutes with 20% assigned to internet radio streaming media content A, 50% assigned to internet radio streaming media content B, and 30% assigned to internet radio streaming media content C, would lead to stream A playing for 6 minutes (106), stream C playing for 15 minutes (108), and stream B playing for 9 minutes (110). The final result is the listener hearing the single sequenced stream via the audio system (112).

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the invention has been described in the context of internet radio stations, it could be used with other types of media content such as webcasts, podcasts, simulcasts or pre-recorded programs. Furthermore, while the exemplary embodiments provide the stream switching locally, the invention contemplates the use of a remote computer system (essentially similar to computer system 36) as a proxy server which can receive the listener selections and preferences, and can then perform the switching to provide a single, uninterrupted stream to the playback device. It is therefore contemplated that such modifications can be made without departing from the spirit or scope of the present invention as defined in the appended claims.

What is claimed is:

1. A method comprising:
    receiving, at a client-side media player, user preferences and stream provider rules, wherein the stream provider rules:
        are unrelated to the user preferences, and
        establish rules for stream play and options for intermixing streams;
    receiving, at the client-side media player, a plurality of different media streams, wherein each of the plurality of different media streams includes a separately customized sequence of media items;
    at the client-side media player, sequencing the plurality of different media streams into a single playout stream based on the user preferences and the stream provider rules; and
    outputting the single playout stream to a user interface.

2. The method of claim 1, wherein the stream provider rules define a minimum amount of play time allotted to the plurality of different media streams.

3. The method of claim 2, wherein the minimum amount of play time is specified as a percentage of an expected media streaming period.

4. The method of claim 1, wherein:
    the stream provider rules define an order in which portions of the plurality of different media streams are assembled into the single playout stream.

5. The method of claim 4, wherein the plurality of different media streams includes a plurality of streaming media radio stations having a same genre, but different formats.

6. The method of claim 1, wherein:
    at least one of the plurality of different media streams is one of an Internet Radio stream having the sequence programmed by a human, an Internet Radio stream having the sequence programmed by an algorithm using input from listener feedback, or an Internet Radio stream having the sequence programmed by a recommendation engine.

7. A client-side device comprising:
    one or more processors;
    a network device coupled to said one or more processors for communication with a network;
    a memory device coupled to said one or more processors;
    program instructions residing in the memory device, the program instructions configured to implement a method including:
        receiving, at a client-side media player, user preferences and stream provider rules, wherein the stream provider rules:
            are unrelated to the user preferences, and
            establish rules for stream play and options for intermixing streams;
        receiving, at the client-side media player, a plurality of different media streams, wherein at least one of the plurality of different media streams includes a separately customized sequence of media items;
        at the client-side media player, sequencing the plurality of different media streams into a single playout stream based on the user preferences and the stream provider rules; and
        outputting the single playout stream to a user interface.

8. The client-side device of claim 7, wherein the stream provider rules define a minimum amount of play time allotted to plurality of different media streams.

9. The client-side device of claim 8, wherein the minimum amount of play time is specified as a percentage of an expected media streaming period.

10. The client-side device of claim 7, wherein:
    the stream provider rules define an order in which portions of the plurality of different media streams are assembled into the single playout stream.

11. The client-side device of claim 10, wherein the plurality of different media streams includes a plurality of streaming media radio stations having different genres.

12. The client-side device of claim 7, wherein:
    at least one of the plurality of different media streams is one of an Internet Radio stream having the sequence programmed by a human, an Internet Radio stream having the sequence programmed by an algorithm using input from listener feedback, or an Internet Radio stream having the sequence programmed by a recommendation engine.

13. A digital program product comprising:
    a non-transitory machine-readable storage medium; and
    program instructions residing in said non-transitory machine-readable storage medium configured to:
        receive, at a client-side media player, user preferences and stream provider rules, wherein the stream provider rules:
            are unrelated to the user preferences, and
            establish rules for stream play and options for intermixing streams;
        receive, at the client-side media player, a plurality of different media streams, wherein at least one of the plurality of different media streams includes a separately customized sequence of media items;
        at the client-side media player, sequence the plurality of different media streams into a single playout stream based on the user preferences and the stream provider rules; and
        output the single playout stream to a user interface.

14. The digital program product of claim 13, wherein the stream provider rules define a minimum amount of play time allotted to the plurality of different media streams.

15. The digital program product of claim 14, wherein the minimum amount of play time is specified as a percentage of an expected media streaming period.

16. The digital program product of claim 13, wherein:
the stream provider rules define an order in which portions of the plurality of different media streams are assembled into the single playout stream.

17. The digital program product of claim 16, wherein the plurality of different media streams includes a plurality of streaming media radio stations having different formats.

* * * * *